(No Model.) 6 Sheets—Sheet 1.
H. SCHNEIDER.
MECHANISM FOR QUICK FIRING GUNS.

No. 470,449. Patented Mar. 8, 1892.

WITNESSES:
Albert Popkins
Jas. L. Skidmore

INVENTOR
Henri Schneider
BY Howson & Howson
his ATTORNEYS.

(No Model.) 6 Sheets—Sheet 2.
H. SCHNEIDER.
MECHANISM FOR QUICK FIRING GUNS.
No. 470,449. Patented Mar. 8, 1892.
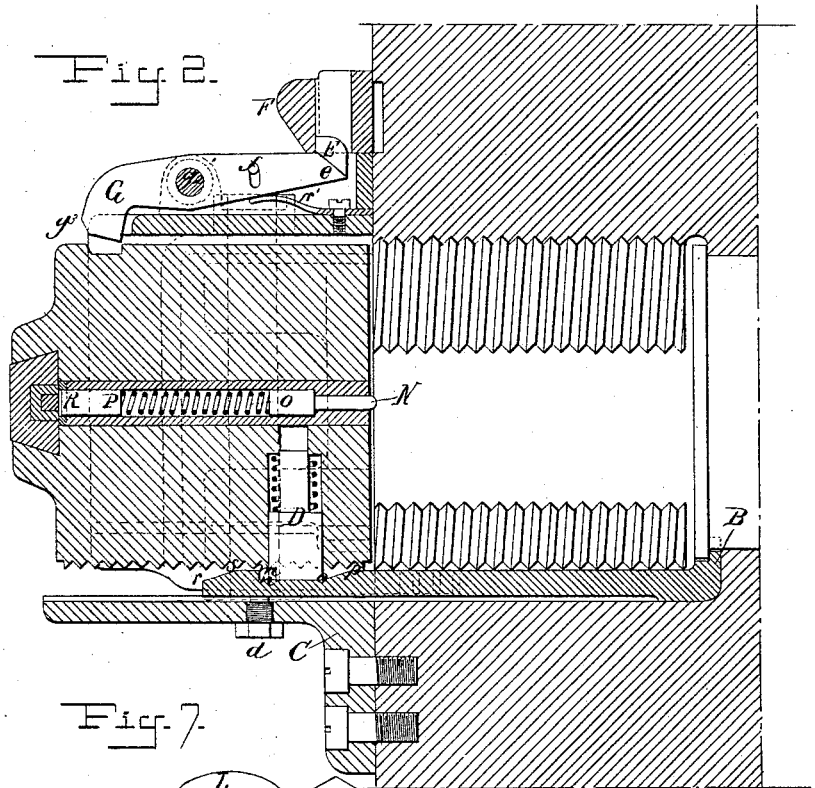
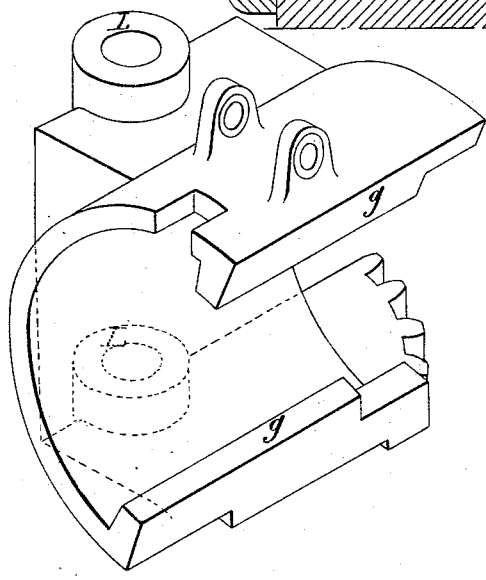
WITNESSES:
George Baumann
James Graen
INVENTOR
Henri Schneider
BY
Howson and Howson
his ATTORNEYS
THE NORRIS PETERS CO., PHOTO-LITHO., WASHINGTON, D. C.

(No Model.) 6 Sheets—Sheet 3.
H. SCHNEIDER.
MECHANISM FOR QUICK FIRING GUNS.
No. 470,449. Patented Mar. 8, 1892.
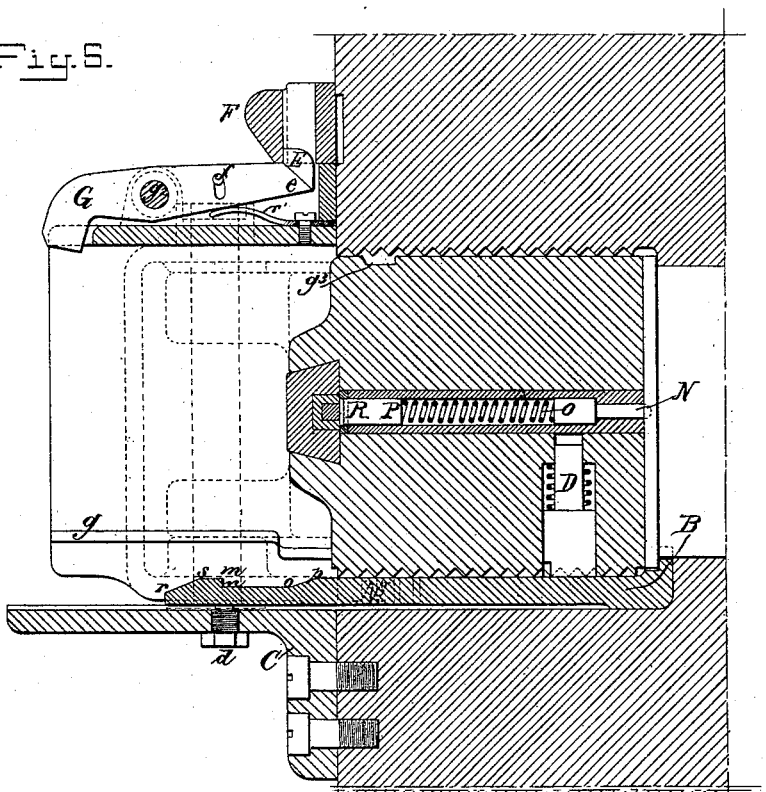
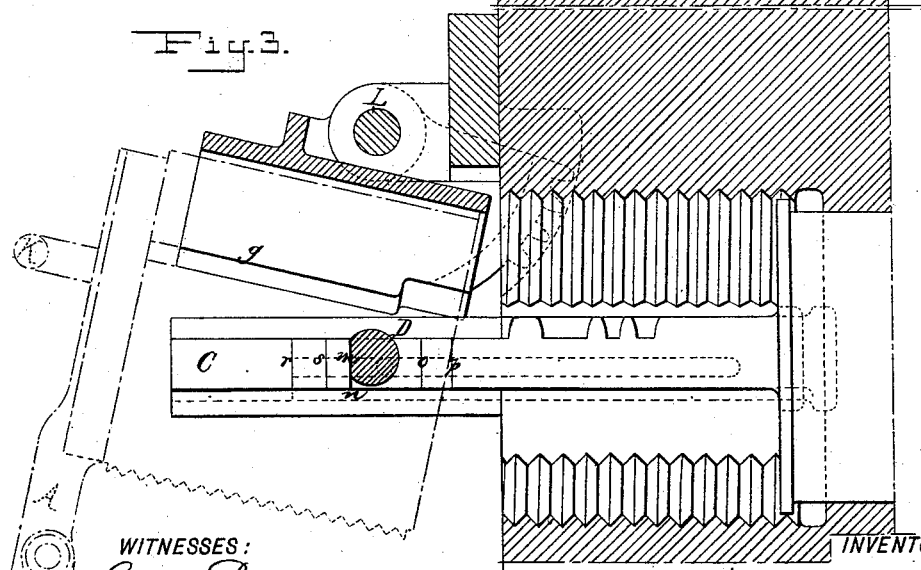

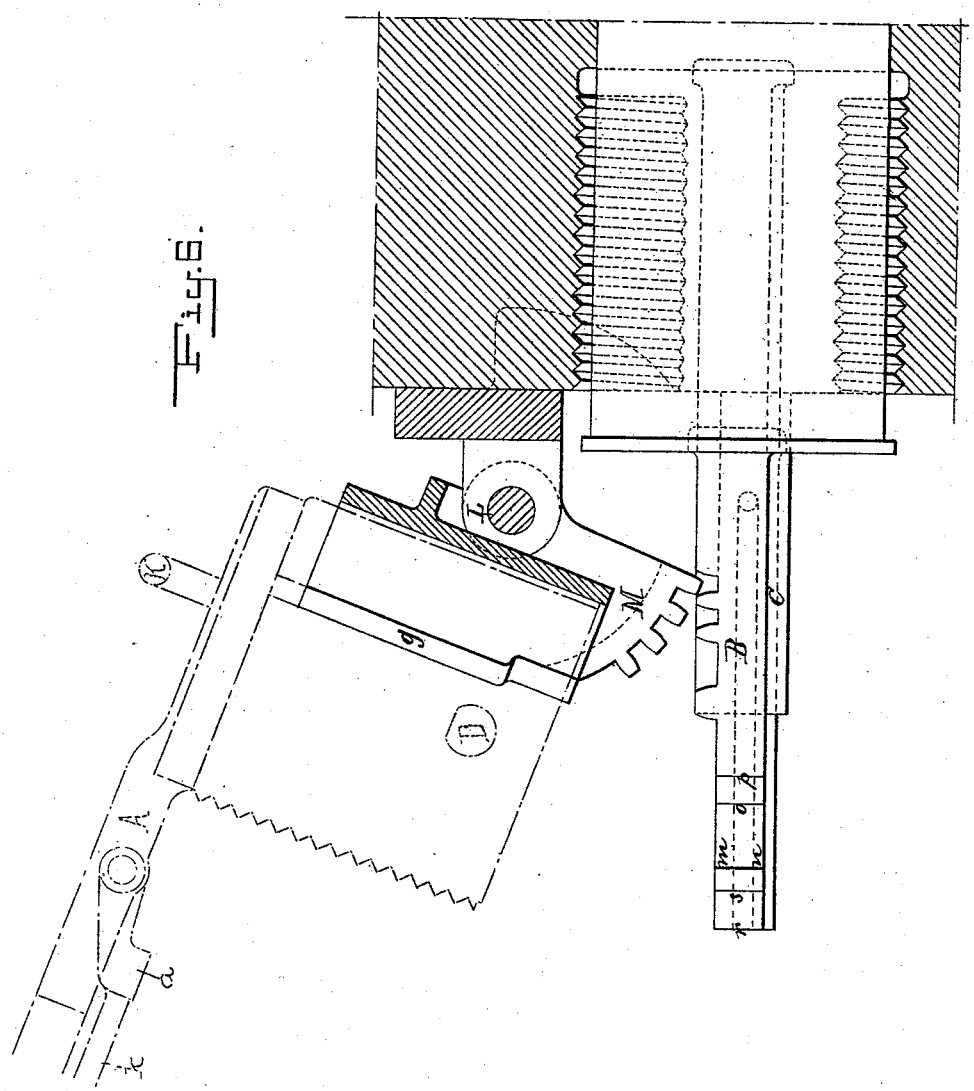

(No Model.)

6 Sheets—Sheet 5.

H. SCHNEIDER.
MECHANISM FOR QUICK FIRING GUNS.

No. 470,449.

Patented Mar. 8, 1892.

WITNESSES:
George Baumann
James Gracie

INVENTOR
Henri Schneider
by
Howson and Howson
his ATTORNEYS (No Model.) 6 Sheets—Sheet 6.
H. SCHNEIDER.
MECHANISM FOR QUICK FIRING GUNS.
No. 470,449. Patented Mar. 8, 1892.
Fig. 11.
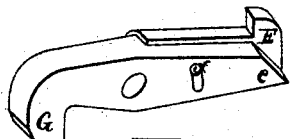
Fig. 12.
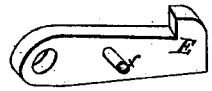
Fig. 13.
  Fig. 16.  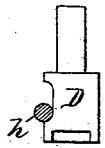
WITNESSES:
George Baumann
James Gracie
INVENTOR
Henri Schneider
BY
Howson and Howson
his ATTORNEYS
THE NORRIS PETERS CO., PHOTO-LITHO., WASHINGTON, D. C.

UNITED STATES PATENT OFFICE.

HENRI SCHNEIDER, OF PARIS, FRANCE, ASSIGNOR TO SCHNEIDER & CO., OF SAME PLACE.

MECHANISM FOR QUICK-FIRING GUNS.

SPECIFICATION forming part of Letters Patent No. 470,449, dated March 8, 1892.

Application filed January 12, 1891. Serial No. 377,513. (No model.)

*To all whom it may concern:*

Be it known that I, HENRI SCHNEIDER, ironmaster, of "Le Creusot," (Saône et Loire,) in the Republic of France, of 56 Rue de Provence, Paris, in the Republic of France, have invented certain Improvements in the Breech-Closing Mechanism of Quick-Firing Guns, of which the following is a specification.

This invention relates to improvements in the breech-closing mechanism of quick-firing guns in which metallic cartridges are employed. In these guns it is sometimes very difficult to remove the metallic cartridges from their chamber. Great force is often necessary, and the firing is consequently rendered slower and sometimes even interrupted. The breech mechanism according to this invention facilitates the extraction of the cartridge-cases after each shot by rendering the operation automatic by the employment of a powerful extractor, which is acted upon by a blow and with great force. The principle and action of this breech-closing mechanism is explained in the following description with reference to the accompanying drawings, in which—

Figure 1:
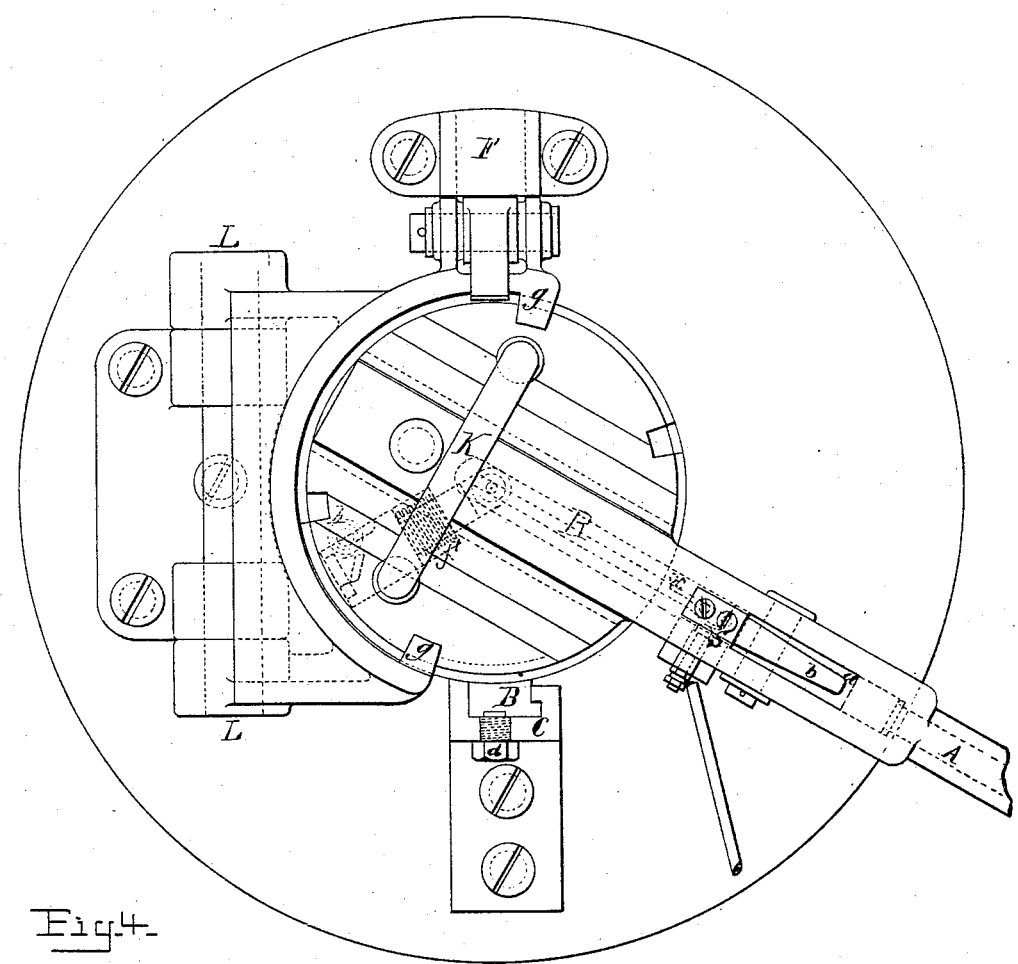
Figure 4:
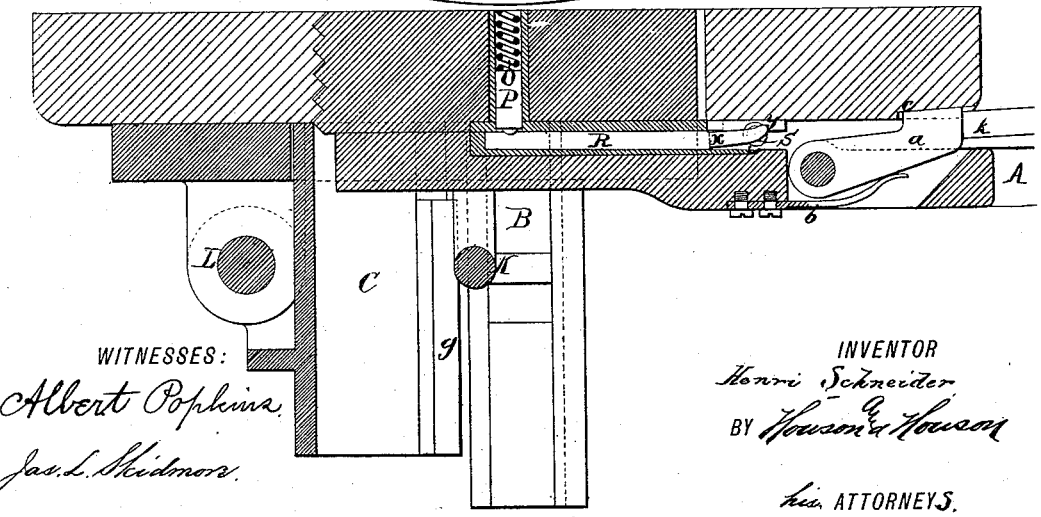
Figure 8:
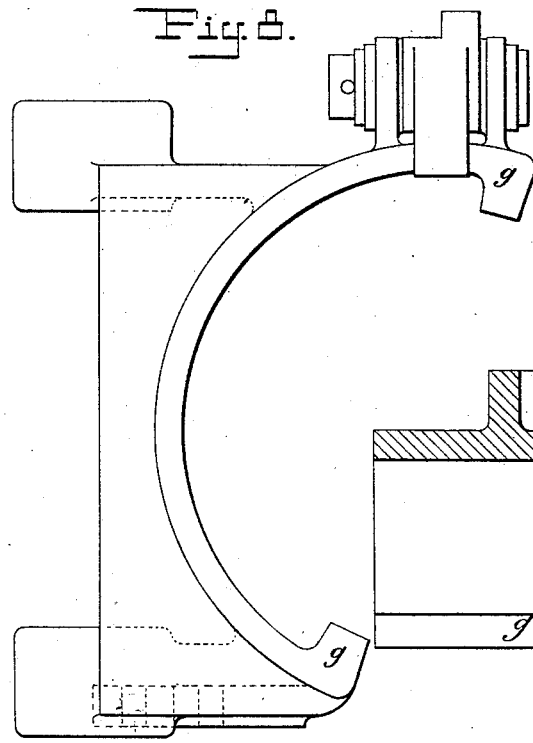
Figure 14:
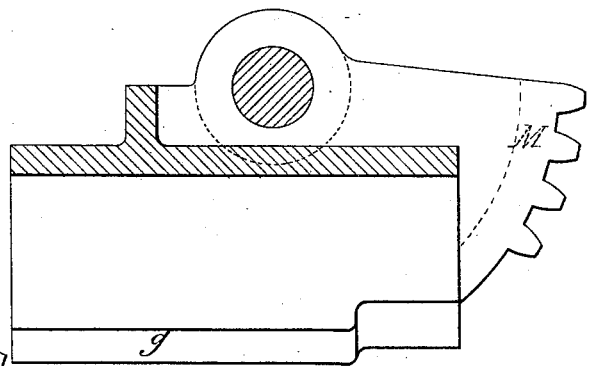
Figure 9:
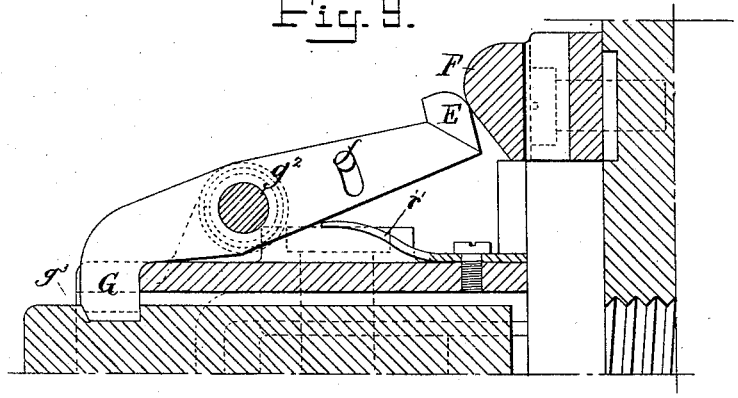
Figure 10:
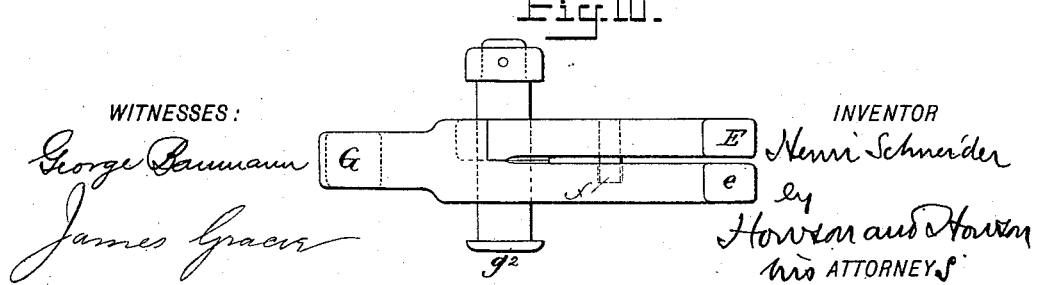

Figure 1 is an end view of the rear of a gun provided with my invention. Fig. 2 is a sectional elevation thereof with the breech-screw withdrawn. Fig. 3 is a sectional plan with the breech-screw withdrawn. Fig. 4 is a sectional plan view showing the working lever. Fig. 5 is a sectional elevation with the breech closed. Fig. 6 is a sectional plan with the breech turned back and the extractor withdrawn. Fig. 7 is a perspective view, and Fig. 8 a front end view, of the movable bracket. Fig. 9 is a sectional elevation of a part of the gun, showing the double lock in a position to lock the breech to the bracket. Fig. 10 is a plan view, and Fig. 11 a perspective view, of the double lock. Fig. 12 is a perspective view of part of the double lock. Fig. 13 is a perspective view of the extractor, and Figs. 14 and 15 are detail views.

The closing mechanism thus represented comprises, as in ordinary guns, a breech-screw with three interrupted threads divided in three equal sections and a brass bracket-support and double catch which rigidly connects the bracket to the gun or to the screw. This catch is arranged at the upper part of the face of the breech, the lower part being reserved for the extractor. Nevertheless these positions are not absolutely essential.

The working of the breech-screw is performed by means of a hand-lever A, Figs. 1, 3, and 4. A cam $a$, Fig. 4, pressed by a spring $b$, engages with the recess $c$ in the breech-face, in order to retain the parts in position. The extractor is constituted by a rectangular bar B, Figs. 1 to 6 and 13, turned up at the front to form a claw and provided with lateral teeth. This bar slides in a groove in the barrel and in a guide-bracket C, attached to the breech-face. The stop-screw $d$, passing through the bracket C and working in the groove $d^x$ of the extractor, limits the backward movement of the extractor. The breech-screw is provided at the front with a striking-tappet D, Figs. 1, 2, 3, 5, and 15, normally pressed downward by a spring $f'$. A screwed pin $h$ limits the movement of this tappet.

*Action of the mechanism.*—The breech being closed, the several parts occupy the position represented in Fig. 1. The claw $b^2$ of the extractor is in front of the rim of the metal cartridge-case, as shown in Fig. 2. On taking hold of the hand-lever A, in order to turn it through one-sixth of a revolution, the hand grasps at the same time the small lever $k$ and moves it toward the handle. This movement disengages the cam $a$, which retained the lever A. When the screw has been turned one-sixth of a revolution, the projections $g$ on the bracket may enter corresponding grooves in the screw. After the breech-screw has been released from the screw-threads of the breech it is drawn backward by pulling back the hand-lever A and the handle K. The screw guided by the projections $g$ on the bracket assumes the position represented in Fig. 2. The double lock E G, Figs. 2, 5, 9, 10, 11, and 12, the function of which is to lock the bracket at one time to the gun and at another time to the breech-screw, is composed of two parts pivoted on the one axis $g^2$, carried by the bracket. One of the parts is provided with the nose E. The other part carries at one end the nose G and at the opposite end the incline $e$. Under the action of the spring $r'$ the nose E remains in engagement with the sear F, attached to the gun, and the incline e is supported against the same sear when the breech is closed, as shown in Fig. 5. The lock remains in this position until the breech-screw is completely withdrawn, as shown in Fig. 2, when the lock is on the point of changing its position to that shown by Fig. 9. The form given to the nose E and its position above the axis of rotation are such that the nose E can only be disengaged from the sear by a very considerable effort. In the movement of opening the breech the screw, being drawn sharply back, strikes the claws $g\ g$. The resulting shock is transmitted by the bracket to the lock, disengaging the nose E from the sear F. As soon as the bracket commences to turn on its hinge L L the incline e slides from the sear F, and the nose G drops into a recess $g^3$ in the breech-screw. The bracket is then locked to the screw, as shown in Fig. 9. A projection $f$, fixed to the part E of the double lock, engages in a suitable groove in the part G and limits the movement of the nose E. At the same time that the nose G of the double catch enters the screw the striking tappet D, pressed downward by the spring $f$, engages in the recess $m\ n\ o\ p$ of the extractor. (See Fig. 2.) By pulling the hand-lever quickly the bracket and the screw are caused to turn upon the hinge L. At the commencement of the rotation the tappet D is brought forcibly in contact with the extractor at $m\ n$ and jerks it sharply backward. This jerk has the effect of loosening the metallic cartridge-case. The rotation of the bracket continuing, the tappet D in its movement draws back the bar of the extractor B, which is afterward engaged by the teeth M, Figs. 3, 6, and 14. The teeth M are arranged upon a sector formed by the prolongation of the lower horizontal rib of the bracket in such a way that they do not begin to act upon the extractor until the tappet D is leaving the recess $m\ n\ o\ p$. The backward movement thus continues until all of the teeth M have acted on the extractor. At this moment the extractor B is again released; but it has been drawn back to such a distance that the metallic case, which it has drawn with it, projects some centimeters from the breech-face. The operator then removes this case and inserts a fresh cartridge in its place, pushing it by hand to the end of the chamber. The rim of this fresh case, acting on the claw $b^2$, returns the extractor to its initial position. The complete turning of the bracket on the face of the gun brings back the nose E to its position of engagement with the sear F, and at the same time the incline e slides on the lower face of the sear, oscillating the lock to disengage the nose G from the breech-screw. Then the bracket is again fixed to the gun. The breech is afterward closed by the ordinary movements. The inclined planes $r\ s\ o\ p$ on the bar of the extractor raise the striking tappet D, thus enabling the breech-screw to be pushed into its place. The hand-lever A resumes the position represented in Fig. 1. The eccentric $a$ re-engages with the recess $o$ to retain the parts in position.

The firing may be effected by means of a percussion apparatus similar to that employed in the guns of the French artillery and some foreign artilleries, or more conveniently by means of an electric firing apparatus. This latter is represented in Figs. 1, 2, and 3 of the annexed drawings. The metallic case is provided with a quick match at the center of its rear face. The electric contact for firing is obtained by the rod N, a brass spring O, a rod P, and a plate R. This latter acts as a spring, Fig. 4, at $x\ y$, and presses on a fixed contact S, when the breech is completely closed. All these parts are carefully insulated. One of the conducting-wires is fixed to the terminal S. The other wire communicates with any part of the barrel. The materials, proportions, forms, and dimensions, as well as the accessory arrangements of the mechanism hereinbefore described, may be modified according to circumstances.

I claim as my invention—

1. In quick-firing guns, the combination of a breech and breech-screw having interrupted screw-threads, with a hand-lever in one with the breech-screw, the said lever provided with a cam $a$ to engage with the breech-face, and a lever $k$ to disengage the cam $a$ from the breech-face, all substantially as and for the purpose set forth.

2. In quick-firing guns, the combination of a breech and a breech-screw having a spring-actuated tappet D, with an extractor B, provided with a claw to engage the cartridge-rim, a hook $m\ n$, adapted to be acted upon by the tappet D, and inclines $r\ s\ o\ p$, substantially as set forth.

3. In quick-firing guns, the combination of a breech and a breech-screw provided with spring-actuated tappet D, with an extractor B, provided with a claw to engage the cartridge-rim, a hook adapted to be acted upon by the tappet D, teeth, inclines $r\ s\ o\ p$, and a bracket for the breech-screw and provided with a toothed segment M to engage the teeth on the extractor, all substantially as and for the purposes set forth.

4. In quick-firing guns, the combination of a breech and a breech-screw provided with a spring-actuated tappet D, an operating-lever having a locking-cam $a$, with an extractor acted upon by the tappet when the breech-screw is withdrawn, all substantially as and for the purposes set forth.

In testimony whereof I have signed my name to this specification in the presence of two subscribing witnesses.

HENRI SCHNEIDER.

Witnesses:
 CHARLES BRÉNOT,
 LÉON CRUNEKENS.